INVENTOR.
WALTER D. LUDWIG
BY
Donnelly, Mentag & Harrington
ATTORNEYS

United States Patent Office 3,101,741
Patented Aug. 27, 1963

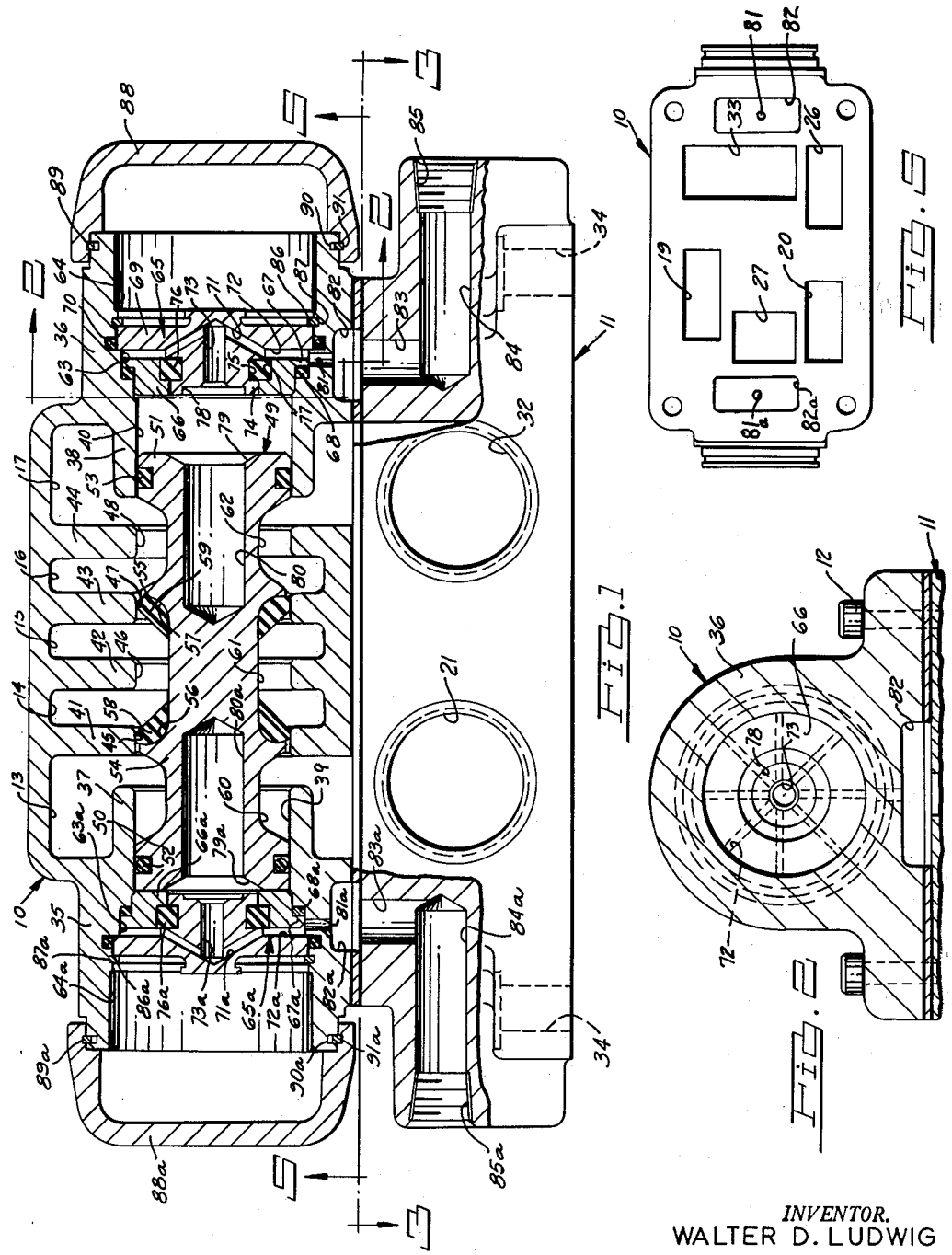

3,101,741
PILOT AIR OPERATED VALVE
Walter D. Ludwig, 3865 W. Lincoln Drive,
Birmingham, Mich.
Filed Apr. 12, 1961, Ser. No. 120,811
7 Claims. (Cl. 137—625.6)

This invention relates to a novel and improved pilot operated four-way reversing valve, and more particularly to a valve of this type which incorporates a pilot air operated master spool.

A disadvantage of the prior art pilot operated type valves is that it is always necessary to provide an adjustment means to regulate the pilot air pressure in accordance with pressure variations in the pilot air supply line. Accordingly, it is an important object of the present invention to provide a four-way reversing valve which is self compensating for pressure variations in the pilot air supply line and which does not need constant adjusting in accordance with such pressure variations. The necessary valve structure for carrying out such adjustments is also eliminated by the valve of the present invention. In the pilot air operated valve of the present invention the forces acting on the master spool pilot are equalized, regardless of the pressure of the pilot air in the supply line and any decreases or increases in the same.

It is another object of the present invention to provide a four-way reversing valve wherein the master spool may be moved by pressurized pilot air from a pressure source to a first operative position and held in place against an opposing spring pressure, and then by means of the introduction of pressurized pilot air from said pressure source to the opposite side of the master spool, the pressure on the master spool may be equalized and the spring becomes a motive force and transfers the spool in the opposite direction to a second operative position. The valve of the present invention is thus capable of utilizing air pressures of different magnitudes from a prime source and yet provide a valve which is accurate and does not need pressure adjusting means and which is adapted for sequence operations of cylinders on a machine.

It is still another object of the present invention to provide a pilot operated reversing valve wherein the master spool is adapted to be slidably mounted for endwise movement in an elongated cylindrical chamber and wherein the ends of the master spool chamber are enclosed by a structure which includes an annular cushion transfer element mounted on a cushion and retainer and which is adapted to receive the stopping impact of the master spool at each end of its travel and cushion the same during a shifting movement of the same. The cushion transfer element is constructed and arranged so as to be mounted on the inner portion of the cushion retainer which functions as a carrier for the cushion and transfer element. The cushion retainer is also provided with an integral outer portion that functions as a dust cap and end cap means for the master spool chamber and through which is formed a plurality of fluid conduits for transferring the pilot pressurized air to the ends of the master spool and, accordingly, the need for conducting pressurized pilot air through the outer retainer dust cap is eliminated.

It is a further object of the present invention to provide a four-way reversing valve wherein the master spool is adapted to be actuated between operative positions either by pilot air, or by pilot air in one direction and by a return spring in the other direction. The novel construction of the valve permits the pressurized air being controlled by the valve and the pilot air to be transmitted to and from the valve body through passages formed in the valve base so that it is not necessary to attach any fluid supply and exhaust conduits to the valve body, whereby, a user of the valve may quickly and easily change the valve body which carries the operating parts of the valve so as to facilitate repairs and replacement of the same.

It is still another object of the present invention to provide a novel reversing valve construction which includes an improved means for cushioning the self-destructive impact forces which occur when stopping master spools moving at high speeds, thereby providing a reversing valve which is rugged and compact in construction and adapted for continuous trouble-free, high speed operation.

Other objects, features and advantages of this invention will be apparent from the following detailed description and appended claims, reference being had to the accompanying drawings forming a part of the specification wherein like reference numerals designate corresponding parts of the several views.

In the drawings:

FIG. 1 is a partial longitudinal elevational sectional view of a four-way reversing valve made in accordance with the principles of the invention and showing the master spool moved to a first position by the pilot air;

FIG. 2 is a fragmentary elevational sectional view of the structure illustrated in FIG. 1, taken along the line 2—2 thereof and looking in the direction of the arrows;

Figures 3, 4:
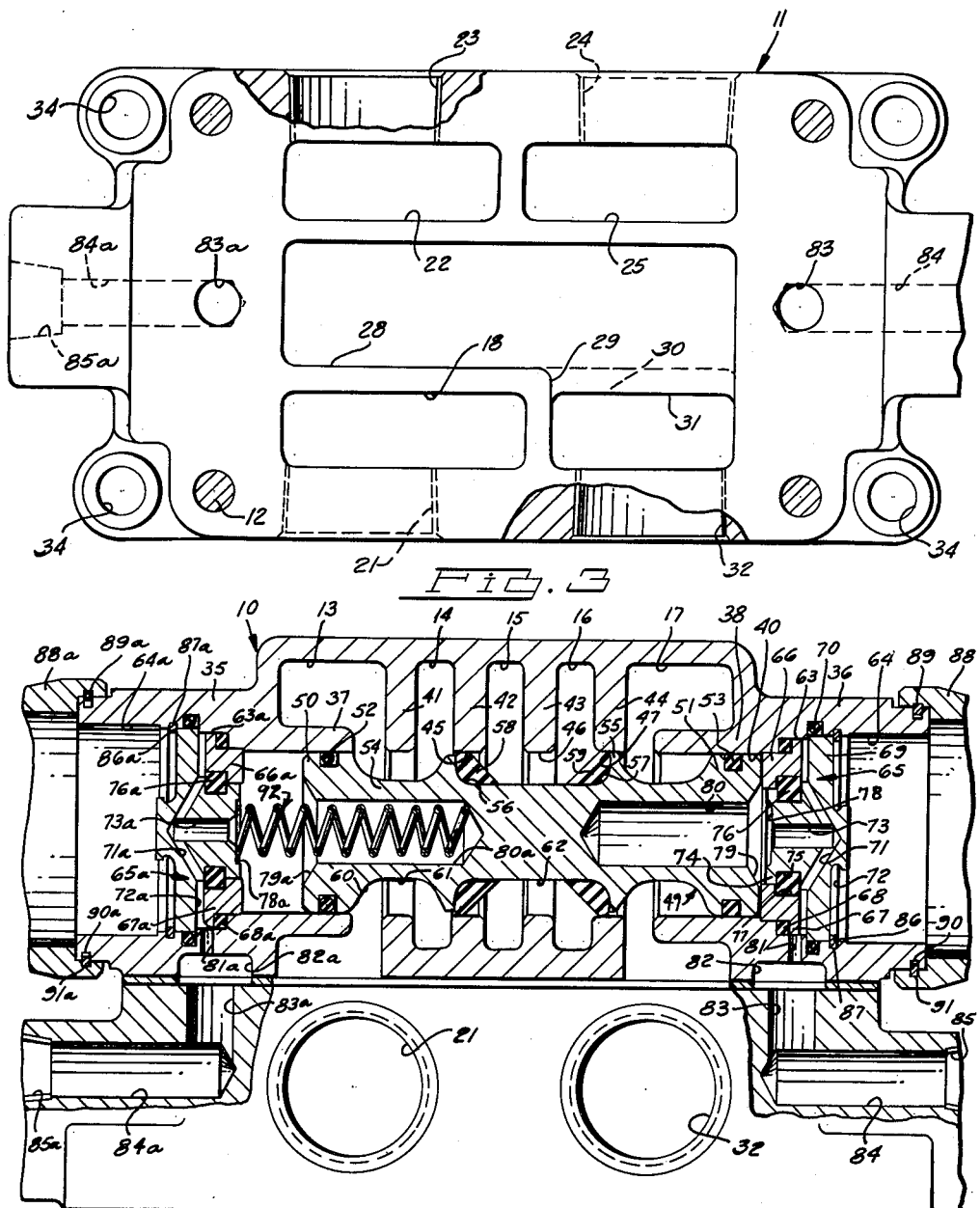
FIG. 3 is a top plan view of the base structure illustrated in FIG. 1, taken along the line 3—3 thereof, and looking in the direction of the arrows.
FIG. 4 is an elevational view, partly in section, with the end portions cut off, of a second embodiment of the invention showing the employment of a return spring for normally moving the master spool in one direction; and, FIG. 5 is a reduced bottom plan view of the valve body structure illustrated in FIG. 1, taken along the line 5—5 thereof and looking in the direction of the arrows.

The valve of the present invention may have the master spool actuated between operating positions by pilot air alone or it may be provided with a spring return means for actuating the master spool in one direction with pilot air operating the master spool in the opposite direction. FIG. 1 illustrates a first embodiment wherein the master spool is actuated in both directions by pilot air. FIG. 4 illustrates a second embodiment of the invention wherein the master spool is actuated in one direction by pilot air and in the other direction by a return spring means. The valve of the present invention was especially adapted for controlling the flow of air under pressure, and it will be obvious that the valve may be used to control other pressure fluids such as a liquid or gas under pressure.

Referring now to the drawings, and in particular to FIGS. 1, 2 and 3, a valve illustrating a first embodiment of the invention is shown and comprises the valve body or housing, generally indicated by the numeral 10, which is adapted to be secured on the base, generaly indicated by the numeral 11, by means of a plurality of socket head screws 12.

As shown in FIG. 1, the valve body 10 is provided with a plurality of annular chambers 13, 14, 15, 16 and 17. The annular chamber 15, which comprises the main pressure fluid supply chamber, is provided on the lower end thereof and at one side thereof with an inlet port 19 as shown in FIG. 5. The structure of the aforementioned annular chambers and their connections with the inlet and exhaust port system in the base 11 is shown in detail in my co-pending United States patent application, Serial No. 749,212, filed July 17, 1958. The inlet port 19 communicates with the passage 18 which is formed in the base 11 and this passage 18 is provided with a fluid inlet port 21 which is adapted to be connected to a suitable source of high pressure fluid, such as air.

The chamber 14 may be termed a first pressure fluid feed or transfer chamber and, as shown in FIG. 5, is provided in one side thereof at the lower end thereof with a port 23 which communicates with the passage 22 in the base 11, as shown in FIG. 3. The passage 22 communicates with the port 23 which is adapted to be connected to one end of a cylinder or fluid motor which is to be controlled by the valve or to some other device which is to be controlled. The base 11 is provided with second port 24 which is adapted to be connected to the other end of the cylinder or the fluid motor which is to be controlled by the valve, and this port communicates with the passage 25 which is formed in the base 11. The passage 25 in the base 11 communicates with the port 26 formed in the lower side of the second transfer chamber 16 so as to communcate this chamber with the other end of the cylinder to be controlled. It will be seen that the supply chamber 15 is disposed centrally between the chambers 14 and 16 in spaced relationship therefrom.

As shown in FIGS. 1, 3 and 5, the chamber 13, which may be termed an exhaust chamber, is provided on the lower end thereof in a central position with an exit port 27 which communicates with the longitudinal passage 28 formed in the base 11. The passage 28 communicates through the opening 29 formed in the vertical base wall 30 and with the passage 31. The passage 31 is exhausted by means of the exhaust port 32 which is formed in the base 11. The second exhaust chamber 17 is provided on the lower side thereof with a substantially centrally disposed exit port 33 which communicates with the exit passage 31 in the base 11 by means of the passage 28 and the opening 29. The base 11 is provided with suitable bolt holes as 34 for the reception of mounting bolts.

As shown in FIG. 1, the valve body 10 is provided with the reduced circular end portions 35 and 36 which include the inwardly extended hubs 37 and 38, respectively. The end portions 36 and 37 are provided with axial bores therethrough, and these bores are stepped and reduced at the inner end thereof as indicated by the numerals 39 and 40, in the hubs 37 and 38, respectively. As shown in FIG. 1, the chamber walls 41, 42, 43 and 44 are provided with axial bores therethrough as 45, 46, 47 and 48, respectively, so as to form passageways between the respective adjacent annular chambers 13, 14, 15, 16 and 17.

As shown in FIG. 1, the valve of the present invention includes a master spool or valve member 49 which is adapted to be slidably mounted in the axially aligned bores 39, 45, 46, 47, 48 and 40 in the valve body 10. The ends of the master spool 49 are provided with enlarged diameter or annular end portions 50 and 51 which are slidably mounted in the hub bores 39 and 40, respectively, and which function as fluid piston heads for master spool shifting purposes as more fully explained hereinafter. The annular spool end portions 50 and 51 are each provided with a peripheral grove in which is operatively seated an O-ring packing or sealing member, as indicated by the numerals 52 and 53. The spool 49 is provided with the longitudinally spaced apart integral annular outwardly extended rings 54 and 55 which are each provided with a groove on the inner face thereof, as 56 and 57. Operatively mounted in the grooves 56 and 57 are the annular sealing rings 58 and 59, respectively, which are adapted to engage the bores 45, 46, 47 and 48, as more fully described hereinafter. The annular rings 54 and 55 are spaced apart longitudinally and coact with the annular end portions 50 and 51 to form the grooves or annular passageways 60, 61 and 62 which are adapted to communicate adjacent chambers in the valve body, as more fully described hereinafter. The annular rings 54 and 55 and the sealing rings 58 and 59, respectively, form a pair of spaced apart valve members which are centrally located on the master spool 49.

As shown in FIG. 1, each end of the valve is provided with similar structure and, accordingly, the structure on the right end, as shown in this view, will be described with certain reference numerals and the similar structure on the left end thereof will be marked with corresponding reference numerals followed by the small letter "a." The bore through the ends of the valve body 10 is enlarged at the outer ends of the bores 39 and 40, as indicated by the numerals 63 and 64, to provide a stepped bore in which is seated an annular cushion retainer member 65 which functions as a cylinder head.

The cushion retainer member 65 comprises the inwardly disposed ring cushion transfer element 66 which is provided with an enlarged annular periphery 67 around the rear end thereof and of a diameter substantially equal to the stepped bore 63. A suitable O-ring sealing means 68 is mounted between the ring portion 63 and the valve body to form a sealing joint therebetween. The cushion retainer 65 further includes the outer annular portion 69 which is seated in the enlarged portion 64 of the bore in the valve body portion 36 and which is spaced apart from the ring portion 66 to form a passage therebetween. A suitable O-ring sealing ring 70 is disposed around the retainer annular member 69 as shown in FIG. 1. The outer retainer portion 69 is solid and is provided with a plurality of drilled holes 71 which communicate at their outer end with the space 72 between the outer retainer portion 69 and the inner ring portion 66. The inner ends of the drilled holes 71 communicate with the axial bore 73 which is formed in the inwardly extended centrally disposed hub 74. The hub 74 extends within the inner retainer ring portion 66 and it is provided with a groove 75 around the periphery thereof which is adapted to receive the annular cushion member 76, which is made from any suitable resilient material as rubber or the like. The cushion member 76 is also adapted to have the outer portion thereof seated in a mating groove 77 formed in the mating retainer ring cushion transfer element 66. It will be seen that the bore 73 communicates at its inner end with the enlarged recess 78 which in turn communicates with the bore 40 in the valve body portion 36. It will be seen that when the master spool is moved to the right as shown in FIG. 1, the center part of the spool end member 51 is recessed as at 79 whereby the spool end will not strike against the outer retainer hub 74 but will engage the ring member 66 whereby the shock of the spool 51 hitting thereagainst will be taken up by the cushion member 76. As shown in FIG. 1, the right end of the spool 49 is provided with an axial inwardly extended hole or bore 80 which communicates with the recess 79 on the outer end thereof.

The annular space 72 between the retainer part 66 and 69 is adapted to communicate with the vertical hole 81 which is formed at the lower end of the valve body and which communicates with the recess 82 on the lower end thereof. The recess 82 communicates with the vertical bore 83 formed in the base 11. As shown in FIGS. 1 and 3, the base 11 is provided with an inwardly extended horizontal bore 84 formed in the right end thereof as viewed in these figures, and communicating at the inner end thereof with the vertical bore 83. The outer end of the bore 84 is threaded as at 85 for connection to a suitable source of pressure fluid. As shown in FIG. 1, the cushion retainer 65 is held in position by means of a C-shaped clip ring 86 which is adapted to be seated in the groove 87 formed in the bore 64. The right end of the valve body 10 is enclosed by the end cover 88 which is provided with a peripheral inner lip adapted to seat on the reduced shoulder of the outer end of the reduced valve body end portion 36. The end cover or dust cap 88 is held in place by means of the retaining clip 89 which is adapted to be seated in the grooves 90 and 91 in the valve body 10 and cover lip, respectively. The end cover structure and retaining clip structure is shown in detail in my aforementioned copending United States patent application. As shown in FIG. 1, the left end structure of the master spool and the valve body is the same as the previously described right end structure and, accordingly, it has been marked with similar reference numerals followed by the small letter "a."

The operation of the valve of the present invention will be described with the starting point as shown in FIG. 1 wherein the master spool 49 is moved to the left end position as shown therein. The pilot air inlet conduits 84 and 84a would be connected to a suitable source of pressure fluid which would be controlled by suitable exterior flow control valves for admitting pilot air under pressure or exhausting the same from the inlet passages 84. When the master spool 49 is in the left side position as shown in FIG. 1, the pilot air will have been exhausted from the left end 50 of the master spool 49 by means of the passages formed by the various bores and recesses 78a, 73a, 71a, 72a, 81a, 82a, 83a and 84a. The pressure fluid for moving the master spool 49 to the left hand position as shown in FIG. 1 would be admitted through the inlet passage formed by the following listed recesses and bores, namely, 84, 83, 82, 81, 72, 71, 73, and 78. The pilot pressure fluid would pass into the cylinder formed within the bore 40 in the space behind the right end 51 of the spool 49 so as to urge it to the left position.

When the master spool 49 is in the position shown in FIG. 1, it will be seen that the inlet port 21 is connected to the main supply chamber 15 and that the main supply chamber 15 is connected by means of the spool groove 61 with the first transfer or feed chamber 14 so as to feed fluid under pressure out through the port 23 to one end of a cylinder or fluid motor to be supplied with pressure fluid. The other end of the cylinder being supplied with fluid would be exhausted through the port 24 and into the second transfer chamber 16. The chamber 16 is in communication with the exhaust chamber 17 by means of the spool groove 62 and the chamber 17 is in communication with the exhaust port 32.

When the pilot pressure fluid being transmitted to the valve is reversed by suitable exterior reversing valve means, which forms no part of this invention, the pilot pressure fluid will be exhausted from behind the right end 51 of the spool 49 and admitted to the left end 51 of the spool 49. The master spool 49 will then be moved to the right hand position with the right end 51 thereof abutting the retainer ring 66. When the master spool 49 is in the right hand position, fluid under pressure will flow from the main supply chamber 15 through the spool groove 61 and into the chamber 16. Pressure fluid will then flow out through the port 24 and to the second end of the cylinder being controlled. The first end of the cylinder being controlled will then be exhausted through port 23 into the chamber 13. The chamber 13 is then exhausted through the passageways 28, 29, 30 and 31 and out through the exhaust port 32 to the atmosphere. The valve may then be reversed by merely reversing the pilot pressure fluid. The pilot pressure fluid could consist of a constant air pressure being exerted on each end of the master spool 49 through the aforementioned pilot pressure conduits, and the desired direction of movement of the master spool 49 may be obtained by merely dumping the air on the end toward which it is desired to have the master spool 49 move. It will be seen that the valve of the present invention is supplied with pilot pressure fluid through the base 11 without any piping being connected to the valve body or housing 10. Also, the pressure fluid being controlled is admitted and exhausted through the ports in the base 11. The novel structure of the valve of the present invention facilitates repairing and replacing the valve body 10 since it is merely necessary to remove the four bolts 12 to remove the valve body 10 from the base 11 for repair and replacement services.

FIG. 4 illustrates a slightly modified valve made in accordance with the principles of the invention and in which the valve is provided with a return spring, generally indicated by the numeral 92, and which is seated in the bore 80a in the left end of the master spool 49. The left end of the return spring 92 abuts the hub 74a of the cushion retainer 65a and is heated in the recess 78a formed therein. The reference numerals on the other parts of this valve are the same as for the embodiment of FIG. 1 since the structure and function thereof is the same. The only difference between the embodiment of FIG. 4 and FIG. 1 is that the second embodiment of FIG. 1 is provided with a return spring 92 for moving the master spool 49 to the right to the position shown in FIG. 4. The master spool 49 would be moved to the left hand position against the action of spring 92 by pilot pressure fluid admitted to the space behind the right hand end 51 of the master spool to remove it to the left. The left pilot inlet pressure fluid 84a would not be connected to any pressure fluid. The second embodiment of FIG. 4 would then function in the same manner as the embodiment of FIG. 1 with the exception being that the master spool 49 is moved in one direction or to the left by means of pilot fluid pressure and in the other direction or to the right by means of the spring 92.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What I claim is:

1. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers to enclose the outer ends thereof; a cushion member carried on the inner side of each of said cushion retainers; a cushion transfer element carried on each of said cushions for stopping impact with the master spool when it is shifted from one end of the valve body to the other, for transferring the stopping impact of the master spool to the cushion; and, means for selectively conducting pressure fluid into each of said end chambers for shifting said master spool.

2. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers to enclose the outer ends thereof; a cushion member carried on the inner side of each of said cushion retainers; a cushion transfer element carried on each of said cushions for stopping impact with the master spool when it is shifted from one end of the valve body to the other, for transferring the stopping impact of the master spool to the cushion; and, fluid passageways formed through said base and valve body for connection to a source of pressure fluid for conducting pressure fluid through said base and thence through said body and into said annular end chambers and against a selective end of said master spool for shifting said master spool.

3. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers to enclose the outer ends thereof; a cushion member carried on the inner side of each of said cushion retainers; a cushion transfer element carried on each of said cushions for stopping impact with the master spool when it is shifted from one end of the valve body to the other, for transferring the stopping impact of the master spool to the cushion; a return spring means operatively mounted in one of said annular end chambers and engaging said master spool for moving the master spool towards the other annular end chamber; and, means for selectively conducting pressure fluid into each of said end chambers for shifting said master spool.

4. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers to enclose the outer ends thereof; a cushion member carried on the inner side of each of said cushion retainers; a cushion transfer element carried on each of said cushions for stopping impact with the master spool when it is shifted from one end of the valve body to the other, for transferring the stopping impact of the master spool to the cushion; each of said cushion retainers having a passageway formed therethrough which has one end thereof in communication with a passageway formed in each end of said valve body adjacent the cushion retainers and which connects with a port on the lower side of the body; and, a pair of passageways formed in said base for connection at one end thereof with the ports in the body and at the other end thereof to a source of pressure fluid for conducting pressure fluid into said annular end chambers and against a selective end of said master spool for shifting said master spool.

5. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers and having an outer portion enclosing the outer ends of the end chambers; said cushion retainer having an integral inwardly extended inner portion which is provided with an annular groove; an annular cushion mounted in the groove on said cushion retainer inner portion; a cushion transfer element; said cushion transfer element being ring shaped and provided with a recess on the outer side thereof; said ring shaped cushion transfer element being seated on said cushion and receiving the same in said recess and adapted to transfer the stopping impact of the master spool to the cushion when the master spool is shifted from one end of the valve body to the other; and, means for selectively conducting pressure fluid into each of said end chambers for shifting said master spool.

6. In a valve construction having a valve body detachably mounted on a base, the combination of, an annular end chamber in each end of said valve body; an elongated master spool slidably mounted in said valve body for controlling the flow of fluid through the valve; said master spool having enlarged ends which are slidably mounted in the inner ends of the annular end chambers so as to slidably engage the interior surface thereof; a cushion retainer mounted in the outer end of each of the annular end chambers and having an outer portion enclosing the outer ends of the end chambers; said cushion retainer having an integral inwardly extended inner portion which is provided with an annular groove; an annular cushion mounted in the groove on said cushion retainer inner portion; a cushion transfer element; said cushion transfer element being ring shaped and provided with a recess on the outer side thereof, said ring shaped cushion transfer element being seated on said cushion and receiving the same in said recess and adapted to transfer the stopping impact of the master spool to the cushion when the master spool is shifted from one end of the valve body to the other; said cushion transfer elements being spaced apart longitudinally inwardly from the cushion retainer outer portion; each of said cushion retainers having a passageway formed therethrough which has one end thereof in communication with the adjacent annular end chamber and the other end thereof in communication with the space between the inner and outer cushion retainer portions; a passageway formed in each end of said valve body adjacent the cushion retainers for connecting the spaces between said inner and outer cushion retainer portions with a pair of ports on the lower side of the valve body; and, a pair of passageways formed in said base for connection at one end thereof with said last named pair of ports and at the other end thereof to a source of pressure fluid for conducting pressure fluid into said annular end chambers and against a selective end of said master spool for shifting said master spool.

7. The valve construction as defined in claim 6, including, a return spring means operatively mounted in one of said annular end chambers and engaging said master spool for moving the master spool toward the other annular end chamber.

References Cited in the file of this patent

UNITED STATES PATENTS

| | | |
|---|---|---|
| 2,591,800 | Gardiner | Apr. 8, 1952 |
| 2,605,079 | Miller et al. | July 29, 1952 |
| 2,859,735 | Di Tirro et al. | Nov. 11, 1958 |
| 2,861,592 | Collins | Nov. 25, 1958 |
| 2,916,019 | Murphy | Dec. 8, 1959 |
| 2,955,617 | Collins | Oct. 11, 1960 |
| 2,993,510 | Collins | July 25, 1961 |
| 3,015,343 | Gardiner et al. | Jan. 2, 1962 |
| 3,023,781 | Larsen | Mar. 6, 1962 |